United States Patent
Damhuis

(10) Patent No.: US 6,979,032 B2
(45) Date of Patent: Dec. 27, 2005

(54) VACUUM PICK-UP HEAD WITH VACUUM SUPPLY VALVE

(75) Inventor: Eduard Hendrikus Johannes Damhuis, Bousval (BE)

(73) Assignee: FMC Technologies, Inc., Chicago, IL (US)

( * ) Notice: Subject to any disclaimer, the term of this patent is extended or adjusted under 35 U.S.C. 154(b) by 82 days.

(21) Appl. No.: 10/298,472

(22) Filed: Nov. 15, 2002

(65) Prior Publication Data

US 2004/0094979 A1     May 20, 2004

(51) Int. Cl.[7] ............................................. B25J 15/06
(52) U.S. Cl. ...................... 294/65; 294/64.1; 294/907; 901/40; 901/46
(58) Field of Search .............................. 294/64.1–64.3, 294/65, 907; 414/627, 737, 752.1; 901/40, 901/46

(56) References Cited

U.S. PATENT DOCUMENTS

| 3,219,379 A | 11/1965 | Ames |
| 3,219,380 A * | 11/1965 | Carliss ...................... 294/64.1 |
| 3,696,596 A | 10/1972 | Wegscheid |
| 3,915,312 A | 10/1975 | Clark |
| 4,600,229 A | 7/1986 | Oten |
| 4,806,070 A * | 2/1989 | Poux et al. ............. 198/750.12 |
| 5,035,568 A * | 7/1991 | Joulin ...................... 414/752.1 |
| 5,059,088 A * | 10/1991 | Klein .......................... 414/627 |
| 5,125,706 A * | 6/1992 | Kuwaki et al. ................ 294/65 |
| 5,344,202 A * | 9/1994 | Ramler et al. .............. 294/64.1 |
| 5,374,091 A | 12/1994 | Gore et al. |
| 5,609,377 A * | 3/1997 | Tanaka ......................... 294/65 |
| 5,685,589 A * | 11/1997 | Kikuchi et al. ................ 294/65 |
| 5,904,387 A | 5/1999 | Nagai et al. |
| 6,065,789 A * | 5/2000 | Nagai et al. ................ 294/64.1 |
| 6,102,459 A * | 8/2000 | Pabst et al. ................. 294/64.1 |
| 6,382,692 B1 | 5/2002 | Schmalz et al. |
| 6,394,519 B1 | 5/2002 | Byers et al. |
| 6,397,885 B1 * | 6/2002 | Golden et al. ......... 137/565.22 |

FOREIGN PATENT DOCUMENTS

DE             3923672 A1      5/1990

* cited by examiner

Primary Examiner—Dean J. Kramer
(74) Attorney, Agent, or Firm—Christensen O'Connor Johnson Kindness PLLC

(57) ABSTRACT

A vacuum pick-up device includes a vacuum supply valve mounted to a distribution manifold to which a plurality of suction cups is attached. The vacuum supply valve is operational to control the vacuum pressure supplied to the suction cups of the device. The vacuum pick-up device further includes a detection device that controls the vacuum supply valve by detecting the selective presence of an object.

17 Claims, 13 Drawing Sheets

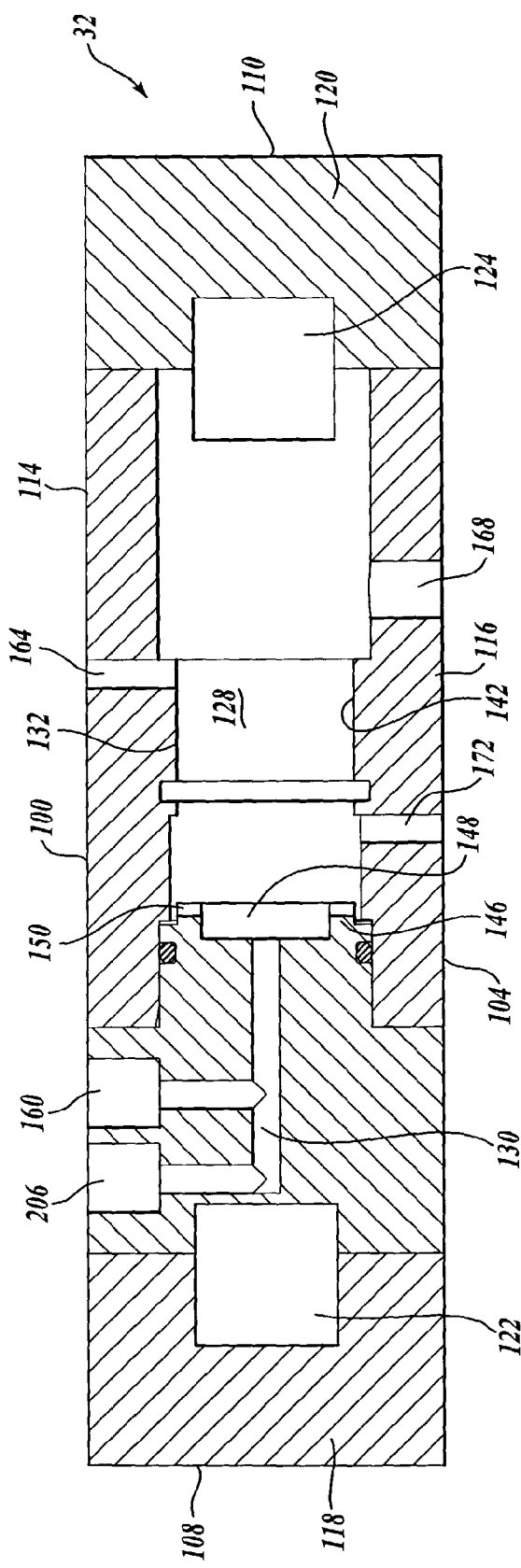
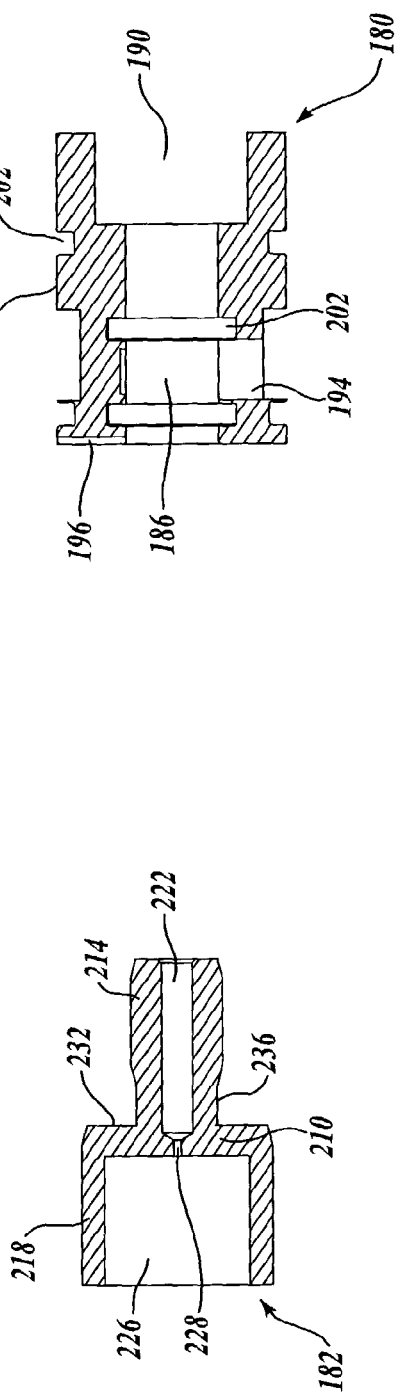
*Fig. 6A.*
*Fig. 6C.*
*Fig. 6B.*

VACUUM PICK-UP HEAD WITH VACUUM SUPPLY VALVE

FIELD OF THE INVENTION

The present invention relates generally to material handling systems and, more particularly, to suction or vacuum pick-up heads for use in material handling systems.

BACKGROUND OF THE INVENTION

Automated material handling systems have been used for many years for transferring manufactured objects from one location to another. These systems typically include a manipulating device, such as a pick-and-place unit, a robot, or a linear motion device, having a gripping device attached thereto for grasping objects that must be transferred from one location to another. In some material handing systems, the gripping devices are in the form of vacuum heads, which utilize vacuum pressure for grasping the objects. The vacuum pressure in these systems is typically generated through a compressed air/Venturi-based vacuum generator and applied through polymeric suction cups. The manipulating devices may include one vacuum head, or a plurality of vacuum heads connected together for providing the material handling system with the flexibility of transporting objects of varying sizes, weights, shapes, etc., or transporting multiple objects simultaneously.

Material handling systems as just described perform well, provided that the leakage between the object to be moved and the vacuum head is limited. Typically, one vacuum generator is used per vacuum head. However, some systems are configured where one vacuum generator is connected to multiple vacuum heads. In such systems, the risk of vacuum loss to the other vacuum heads increases if one or more vacuum heads does not have a proper seal against the object or objects to be transported.

In these systems where multiple vacuum heads are used, there is a need to control the vacuum loss present in such vacuum heads that does not obtain or maintain an adequate gripping or grasping force between the vacuum head and the object(s) to be moved.

SUMMARY OF THE INVENTION

In accordance with aspects of the present invention, a pick-up head usable in a material handling system for grasping an object by vacuum pressure is provided. The pick-up head includes at least one main suction device adapted to be connected in fluid communication to a source of vacuum pressure. The main suction device is configured to apply vacuum pressure supplied thereto against the object. The pick-up head also includes a valve for selectively supplying vacuum pressure from the vacuum pressure source to the main suction device. The valve has an open position, wherein vacuum pressure is supplied to the main suction cup, and a closed position, wherein the supply of vacuum pressure is interrupted to the main suction device. The pick-up head further includes an object detection device operable to detect the presence of the object and to control the operation of the valve between the open and closed positions.

In accordance with another aspect of the present invention, a vacuum pick-up device usable in a material handling system for grasping an object with vacuum suction is provided. The pick-up device includes a distribution manifold having a detection device port, a vacuum valve port, at least one suction cup port, and at least one conduit interconnecting the suction cup port and the vacuum valve port. The pick-up device also includes at least one suction cup connected to the distribution manifold. The suction cup has a sealable contact surface defining an orifice, which is connected in fluid communication with the suction cup port for receiving a supply of vacuum suction thereto. The pick-up head further includes a detection device operable to detect the presence of the object and connected to the distribution manifold, and a vacuum supply valve defining a chamber and having a piston movably disposed therein. The chamber is connected in fluid connection to a source of vacuum suction, and further connected in fluid communication to the detection device port and the suction cup port. The vacuum supply valve has a first position, wherein vacuum suction from the source of vacuum suction is supplied to the orifice of the suction cup, and a second position, wherein vacuum suction from the source of vacuum suction is interrupted to the orifice of the suction cup. The movement of the piston between the first and second positions is controlled automatically by the detection device.

In accordance with still another aspect of the present invention, a method for controlling the supply of vacuum pressure to a suction device with vacuum supply valve is provided. The vacuum supply valve has a valve body that defines a chamber, a piston movable within the chamber, thereby subdividing the chamber into first and second chamber regions, and a vacuum port interconnecting the second chamber region in fluid communication with the suction device. The piston is movable to selectively interrupt the fluid communication between the second chamber region and the vacuum port. The method includes connecting a source of vacuum pressure to the second chamber region of the vacuum supply valve chamber; connecting a source of atmospheric pressure to the first chamber region of the vacuum supply valve chamber; and establishing fluid communication between the source of vacuum pressure and the suction device by creating a vacuum environment within the first chamber region.

In accordance with yet another aspect of the present invention, a method for grasping an object by a pick-up device using vacuum pressure is provided. The method begins with providing a pick-up device having at least one suction cup and a vacuum supply valve selectively interconnecting in fluid communication the suction cup and a source of vacuum pressure. The presence of the object is then determined and, based on the determination that the object is present, fluid communication between the source of vacuum pressure and the suction cup is established by opening the vacuum supply valve, thereby supplying vacuum pressure to the suction cup for grasping the object.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 6A is a cross-sectional view of the valve body of the vacuum supply valve shown in FIG. 5;

FIG. 6B is a cross-sectional view of the piston of the vacuum supply valve shown in FIG. 5;

FIG. 6C is a cross-sectional view of the valve cylinder of the vacuum supply valve shown in FIG. 5;

DETAILED DESCRIPTION OF THE PREFERRED EMBODIMENT

The present invention will now be described with reference to the accompanying drawings where like numerals correspond to like elements. The present invention is directed to a vacuum pick-up head for use in a material handling system. Specifically, the present invention is directed to a vacuum pick-up head having a vacuum supply valve operational to control the supply of vacuum pressure to the suction cups attached thereto. More specifically, the present invention is directed to a vacuum pick-up head having a vacuum supply valve, the operation of which is controlled by the presence of an object detected by the pick-up head. While the vacuum pick-up head of the present invention has its primary application in material handling systems, it will be appreciated that the vacuum pick-up head of the present invention may be used in other systems desiring the ability to control vacuum pressure supplied to a vacuum head. Thus, the following description relating to vacuum pick-up heads for use with a material handling system is meant to be illustrative and not limiting the broadest scope of the inventions, as claimed.

Figure 1:
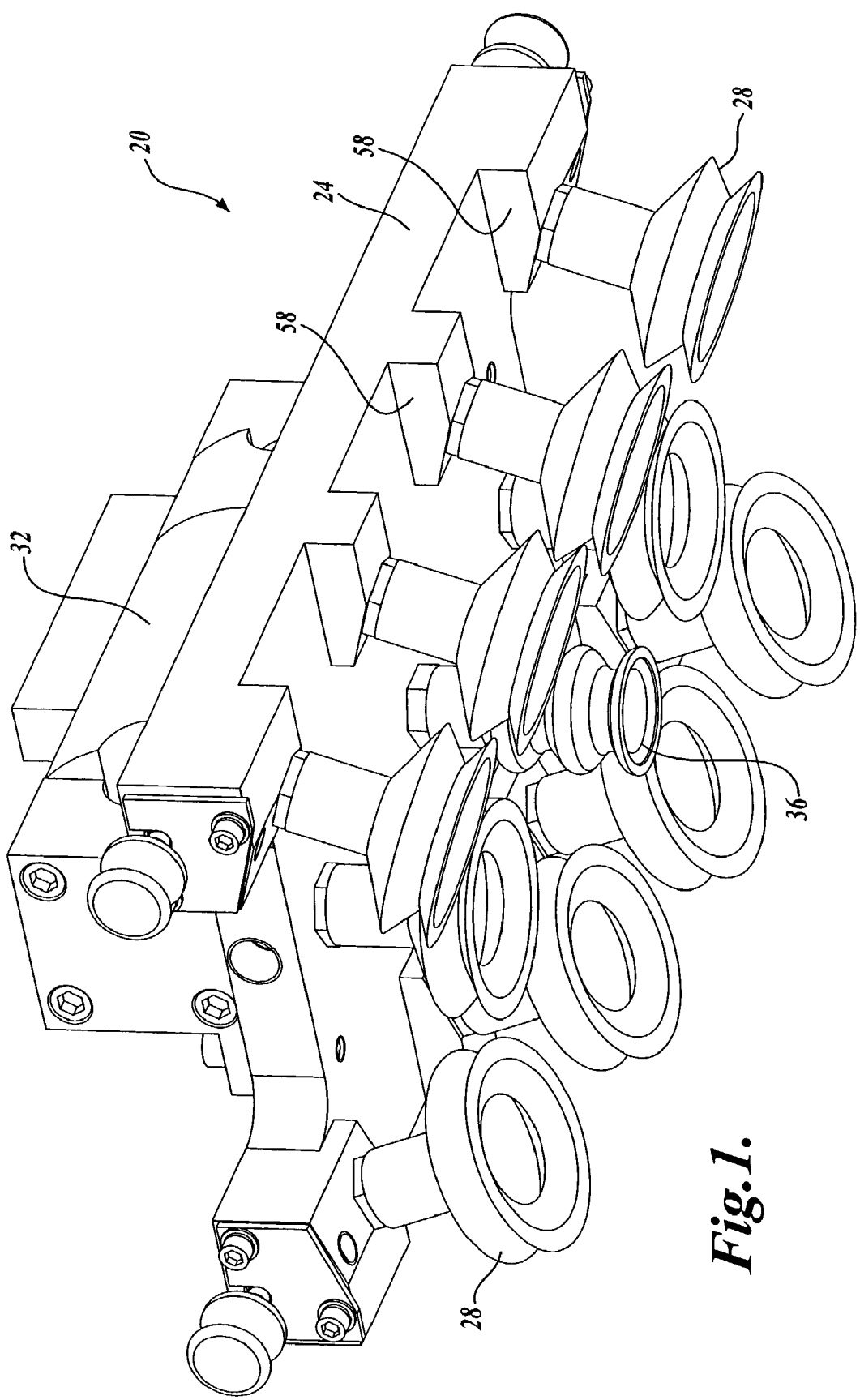
FIG. 1 is a perspective view of a vacuum pick-up head with an integrated vacuum supply valve constructed in accordance with the present invention.
Figure 2:
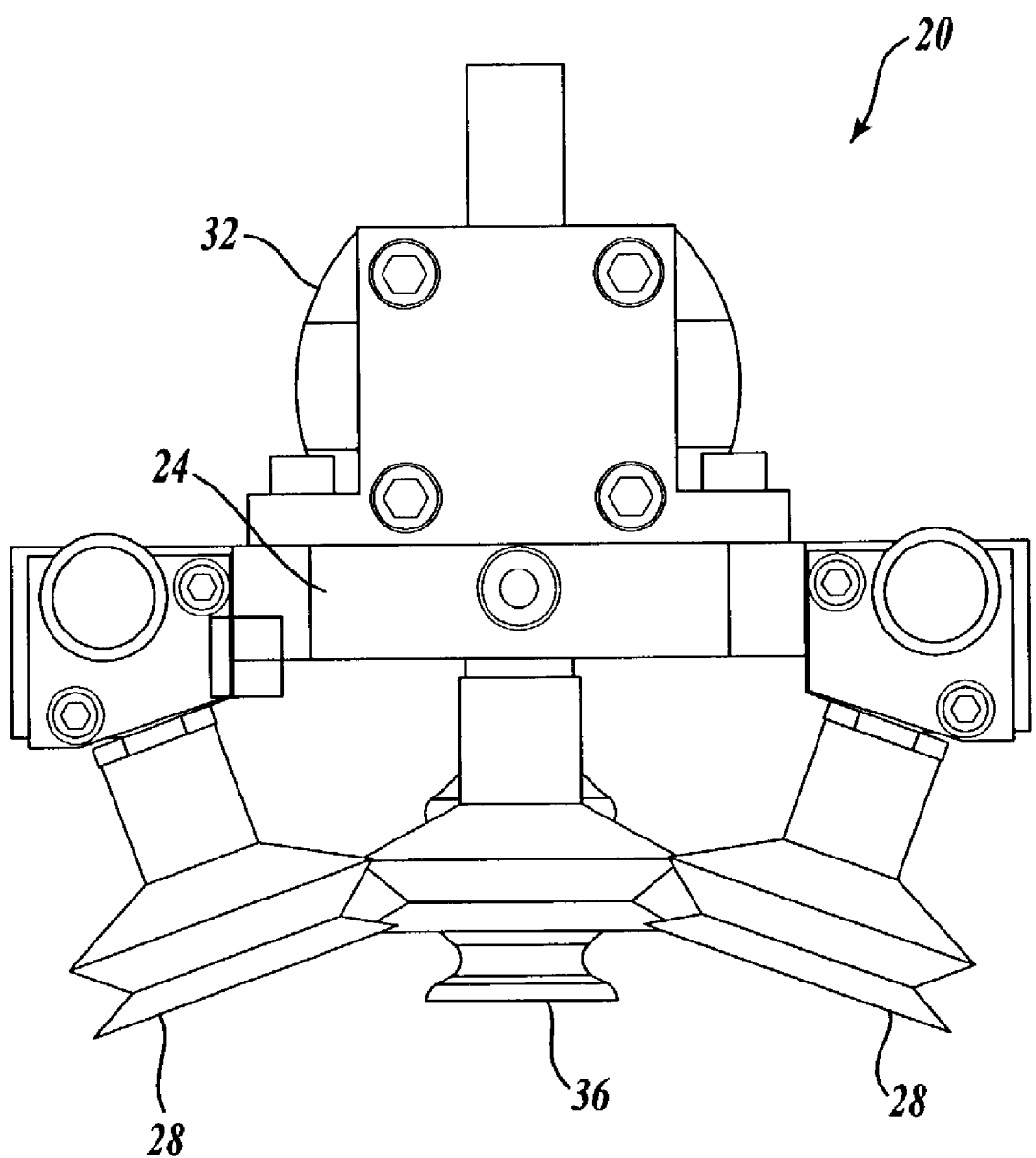
FIG. 2 is an end view of the vacuum pick-up head of FIG. 1.
Figure 3:
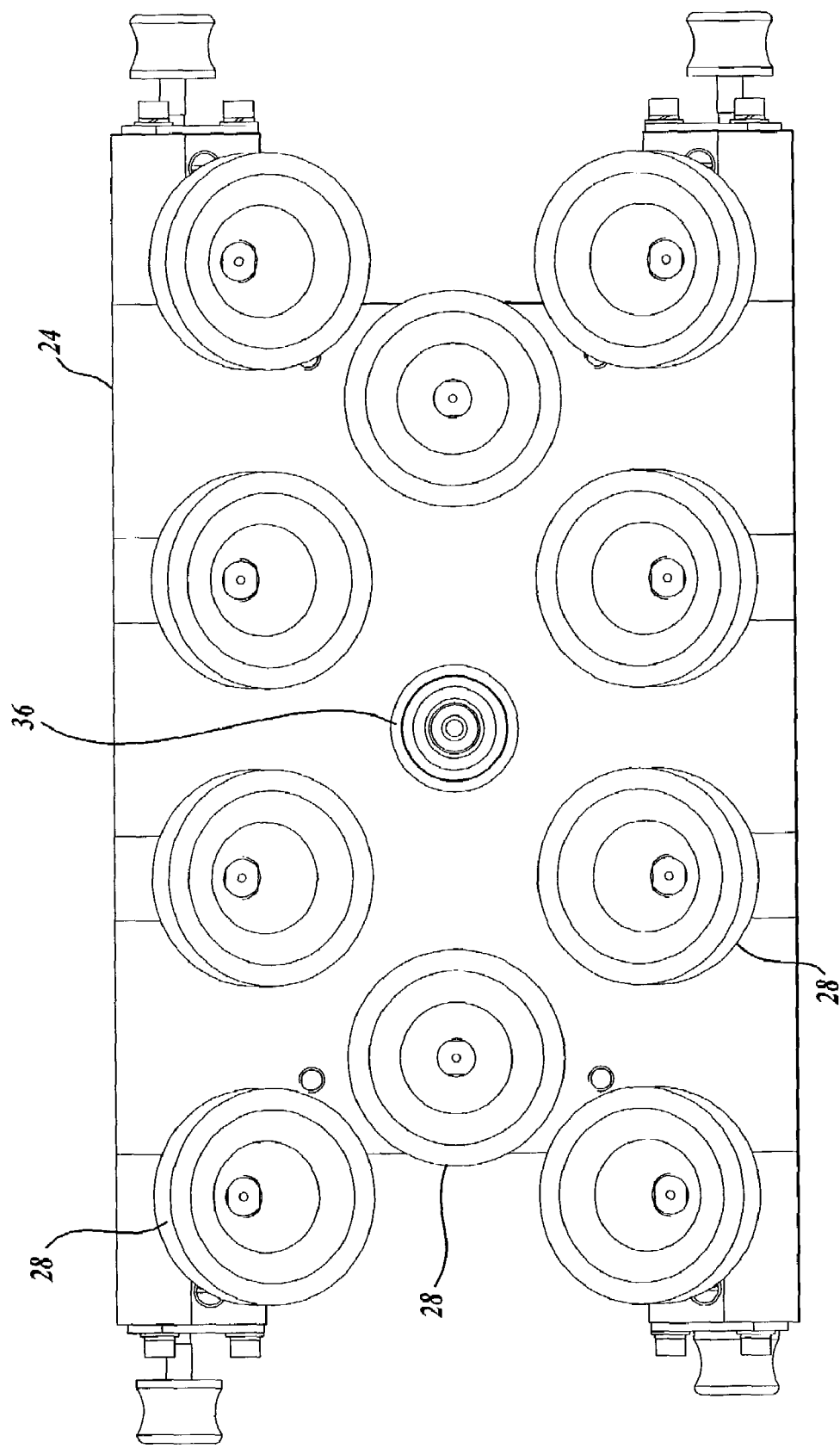
FIG. 3 is a bottom view of the vacuum pick-up head of FIG. 1.

One suitable embodiment of a vacuum pick-up head 20 (hereinafter "the pick-up head 20") constructed in accordance with aspects of the present invention is illustrated in FIGS. 1 and 2. FIGS. 1 and 2 show a perspective view and a front view of the pick-up head 20, respectively, which is adapted to be connected to a manipulating device (not shown), such as a robot arm, "pick-and-place" device, or linear actuator, to name a few, in a material handling system. The pick-up head 20 includes a distribution manifold 24 to which a plurality of suction devices, generally referred to as suction cups 28, is connected. The pick-up head 20 also includes a vacuum supply valve 32 attached to the top of the distribution manifold 24 for controlling the supply of vacuum pressure to the plurality of suction cups 28. The pick-up head 20 further includes an object detection device illustrated as a pilot suction cup 36 for controlling the operation of the vacuum supply valve 32 between an open state, where vacuum pressure is supplied to the suction cups 28, and a closed state, where the vacuum supply valve interrupts the supply of vacuum pressure to the suction cups 28. In operation, when the pilot suction cup 36 senses or detects the presence of an object to be grasped, the vacuum supply valve 32 is operated from the closed state to the open state, thereby supplying vacuum pressure to the suction cups 28 for grasping the object.

Figure 4:
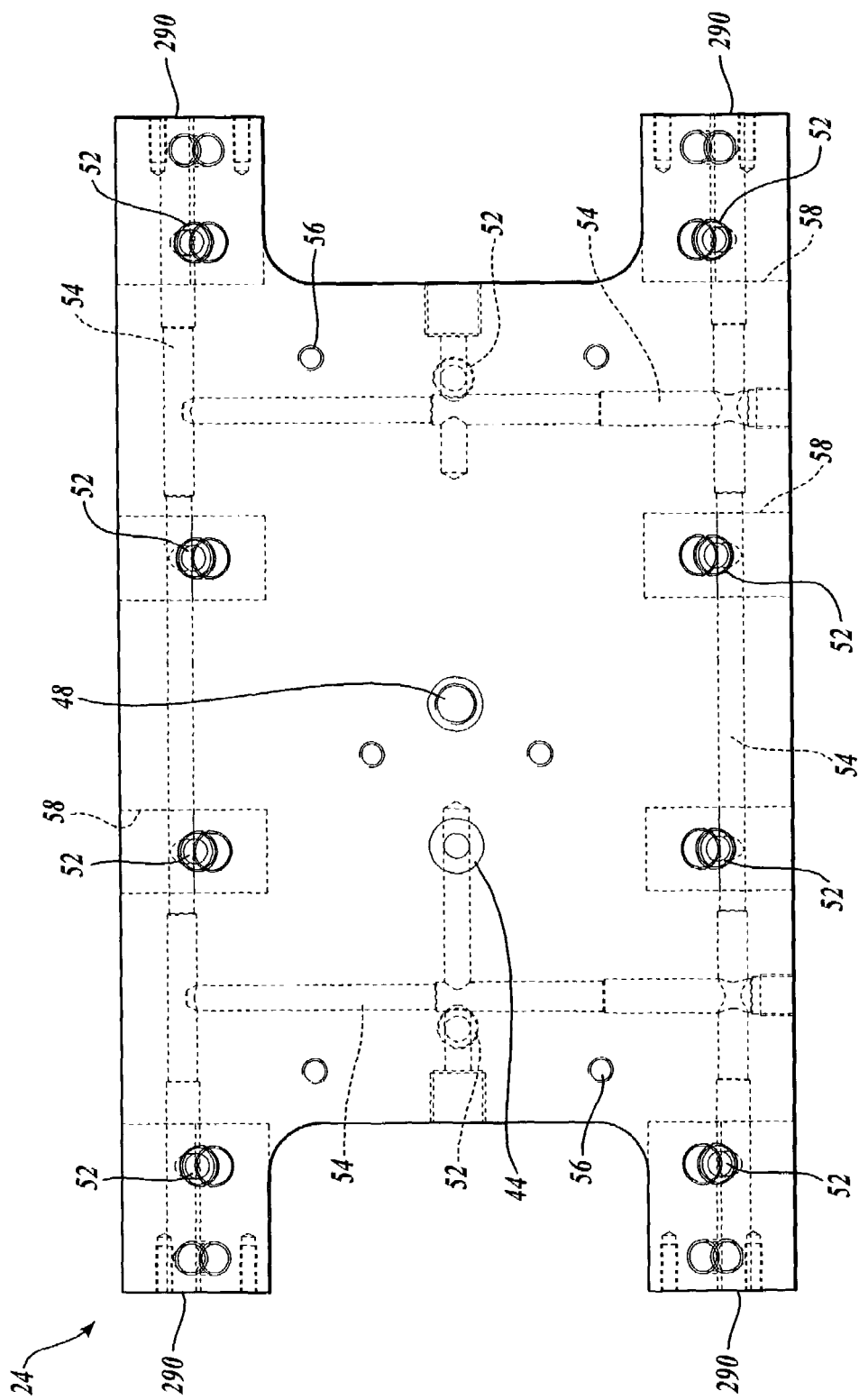
FIG. 4 is a bottom view of the distribution manifold of the vacuum pick-up head of FIG. 1.

The components of the pick-up head 20 will now be described in turn. FIG. 4 is a bottom view of the distribution manifold 24. The distribution manifold 24 includes a vacuum valve port 44, a pilot suction cup port 48 that extends through the distribution manifold 24 from its top surface to its bottom surface, and one or more suction cup ports 52. The vacuum valve port 44 and the suction cup ports 52 open out of the bottom of the distribution manifold 24 and are interconnected in fluid communication by vacuum channels 54 routed through the distribution manifold 24. It will be appreciated that the locations of the suction cup ports 52 are determined based on the type of object to be grasped by the pick-up head 20, including the weight, shape, and material, etc., of the object, which in turn, determines the arrangement of the vacuum channels 54.

In the embodiment shown, the suction cup ports 52 are arranged longitudinally in two rows of four ports along the longitudinal sides of the distribution manifold 24, with the pilot suction cup port 48 positioned in the approximate center of the distribution manifold 24 and flanked by two suction cup ports 52. The distribution manifold 24 further includes internally threaded mounting bores 56 for receiving cooperating fasteners for connecting the vacuum supply valve thereto. The bottom of the distribution manifold 24 may optionally be configured with suction cup mounting blocks 58 having suction cup ports 52 arranged therein such that the suction cups tilt inward toward the longitudinal axis of the pick-up head 20 when the suction cups are secured thereto, as best shown in FIGS. 1 and 4. While the distribution manifold 24 in FIG. 4 depicts the vacuum channels 54 as being open to the atmosphere through various openings, it will be appreciated that these openings will be sealed during the operation of the pick-up head. As will be described in more detail below, the openings 290 in the vacuum channels 54 at the ends of the distribution manifold 24 may optionally be sealed by vacuum interruption actuators for selectively interrupting vacuum pressure to selected suction cups.

Figure 5:
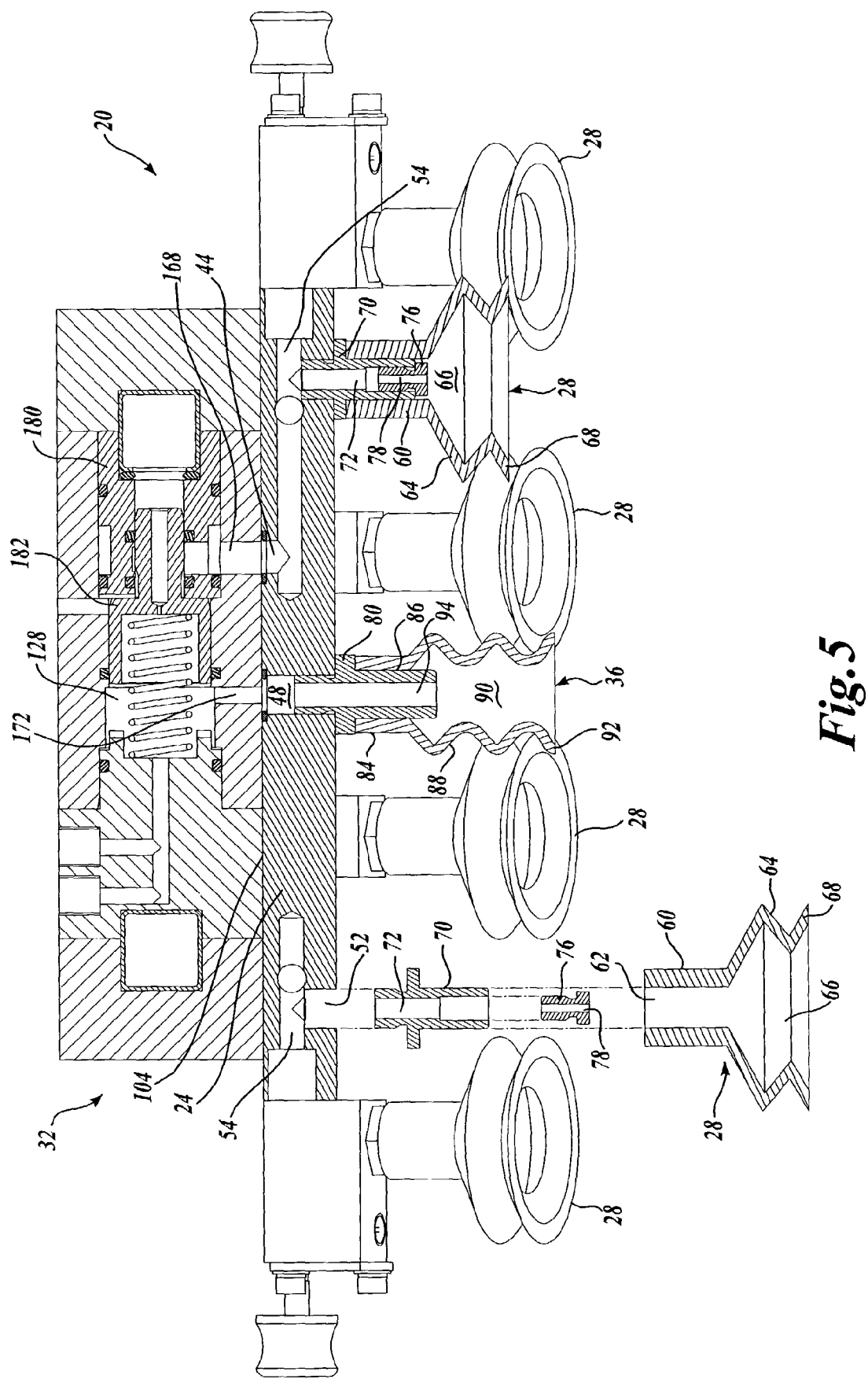
FIG. 5 is a longitudinal cross-section view of the vacuum pick-up head of FIG. 1, with one suction cup exploded therefrom.

Turning now to FIG. 5, there is shown a cross-sectional view of the pick-up head 20 having a plurality of suction cups 28 connected to the bottom of the distribution manifold 24. Each suction cup 28, preferably constructed of a polymeric material, such as rubber or synthetic rubber, includes a stem 60 through which a bore 62 is routed, and an open ended bellows skirt 64 that forms an open ended suction cup cavity 66. The skirt 64 terminates at a peripherally extending sealing lip 68. In the embodiment shown, the suction cups 28 are connected at their stems 60 to the suction cup ports 52 by connector fittings 70. The connector fittings 70 may be configured at one end to be connected to the suction cup ports 52 in a press fitting manner, and configured at the opposite end to be inserted into the suction cup base bore 62 in a tight fitting manner. Alternatively, the connector fittings and the suction cup ports may be cooperatively configured for threadably securing the connector fitting to the distribution manifold 24. It will be appreciated that the suction cups 28 may be further retained on the connector fittings 70 by mechanical methods, such as retainer rings or clamps, or chemical methods, such as adhesives. Each connector fitting 70 may include a sufficiently sized through bore 72 to interconnect the suction cup cavity 66 with the vacuum channels 54 in fluid communication. In operation, when the sealing lip 68 of the suction cup 28 engages the object to form a substantially leak-proof seal, vacuum pressure supplied to the suction cup cavity 66 through the vacuum channels 54 will generate a vacuum environment in the cavity 66, thereby allowing the suction cups 28 to grasp and retain the object for movement with the pick-up head 20.

The connector fittings 70 for each suction cup 28 may optionally be configured to receive a flow restrictor 76 for restricting the flow through the suction cups 28. In the embodiment shown, the flow restrictors 76 may be inserted in a press fitting manner into the through bores 72 of the connector fittings 70, opening into the suction cup cavity 66. Each flow restrictor 76 is configured with a longitudinal through bore 78 having a diameter smaller than the connector fitting bores 72. It will be appreciated that flow restrictors 76 having different diameters may be used, or that only selected suction cups may include flow restrictors, so that the flow through each suction cup may be controlled individually by the operator. By having the ability to individually control the flow through each suction cup, vacuum losses may be limited in embodiments of the pick-up head that utilize more than one suction cup to grasp the object when inadequate sealing conditions exist (e.g., when one or more suction cups does not seal against the object to be grasped).

Similarly constructed as the suction cups 28, the pilot suction cup 36 is preferably made of a polymeric material, such as rubber or synthetic rubber, and is connected to the pilot suction cup port 48 by a pilot connector fitting 80. The pilot suction cup 36 includes a stem 84 through which the nipple 86 of the fitting 80 is routed, and an open ended bellows skirt 88 that forms an open ended pilot suction cup cavity 90. The skirt 88 terminates at a peripherally extending sealing lip 92. The length of the pilot suction cup 36 is preferably greater than the suction cups 28 so that it extends further beyond the bottom surface of the distribution manifold 24. Accordingly, the pilot suction cup 36 contacts the selected object before the main suction cups when the pick-up head is moved into position for grasping the selected object. The pilot connector fitting 80 includes a through bore 94 for interconnecting the pilot suction cup cavity 90 and the pilot suction cup port 48 in fluid communication.

In operation, when the sealing lip 92 of the pilot suction cup 36 engages the object to form a substantially leak-proof seal, vacuum pressure supplied to the pilot suction cup cavity 90 through the pilot valve port 48 will generate a vacuum environment in the cavity 90, thereby allowing the pilot suction cup 36 to maintain sealable contact with the object.

Figure 7:
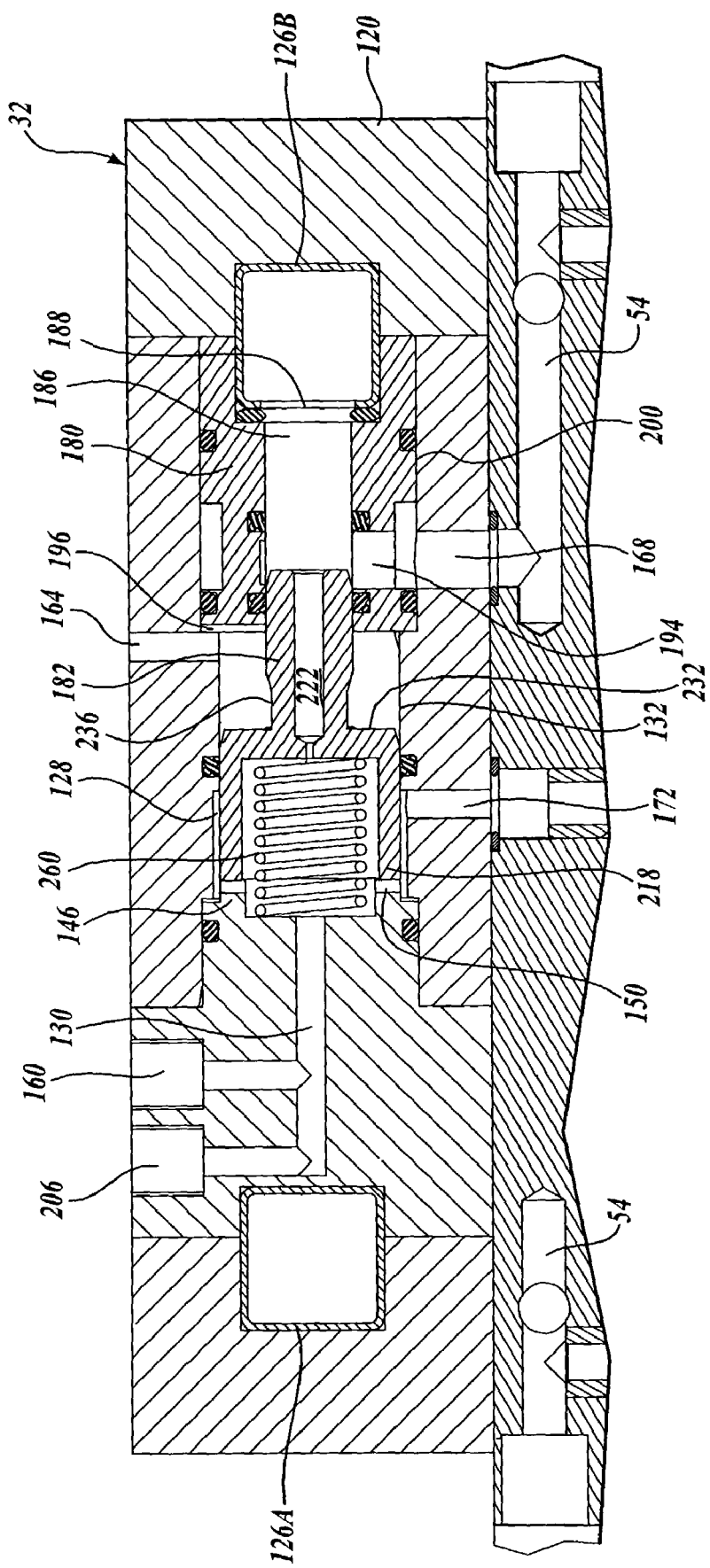
FIG. 7 is a partial longitudinal cross-section view of the vacuum pick-up head, wherein the vacuum supply valve is in the open position.

Still referring to FIG. 5, the vacuum supply valve 32 is mounted to the top of the distribution manifold 24 through fasteners (not shown), such as bolts or other fastening methods known in the art. As best shown in FIG. 6A, the vacuum supply valve 32 includes a top surface 100, a bottom surface 104, and end surfaces 108 and 110. In the embodiment shown, the vacuum supply valve 32 also includes a valve body 114 formed by a middle section 116 connected at its ends to mounting blocks 118 and 120 by fasteners or other means known in the art. When assembled, the middle section 116 and the mounting blocks 118 and 120 cooperatively define parallel, spaced-apart through bores 122 and 124 for supporting vacuum tubes to be inserted therethrough. Referring to FIG. 7, there is shown two vacuum tubes 126A and 126B inserted into the through bores of FIG. 6A. The vacuum tubes 126A and 126B each are adapted to be connected to a source of vacuum pressure, such as a vacuum pump. Alternatively, both vacuum tubes 126A and 126B may be adapted to be connected to the same source of vacuum pressure.

Returning now to FIG. 6A, the valve body 114 further includes inner sidewall surfaces that define a chamber 128, which is fluidly connected to through bore 124 at one end and connected to a longitudinal passageway 130 at its opposite end. The chamber 128 may have a substantially constant cross section except for the middle of the chamber, where there is formed an inwardly protruding shoulder 132. The shoulder 132 defines contact surfaces 142 that extend parallel with the chamber 128. Protruding into the end of the chamber 128 proximate to the passageway 130 is a flange 146. The flange 146 may have a smaller cross-section than the adjacent end of the chamber 128, and forms a step bore 148 that fluidly communicates with and forms a portion of the chamber 128. The end face of the flange 146 is formed with grooves 150 so as to provide fluid communication between the area of the chamber outward of the flange 146 and the bore 148. In the embodiment shown, the passageway 130 opens into the bore 148.

The valve body 114 further includes a first valve port 160, a second valve port 164, a vacuum valve port 168, and a pilot suction cup port 172. The first valve port 160 is disposed in the top surface 100 of the valve body 114 and is connected in fluid communication with the passageway 130. The first valve port 160 is adapted to be selectively connected in fluid communication to a source of atmospheric pressure through a solenoid valve (not shown). As such, the atmospheric pressure source is selectively supplied to the first valve port 160 by the operation of the solenoid valve. Likewise, the second valve port 164 is disposed in the top surface 100 of the valve body 114 spaced-apart from the first valve port 160 and fluidly connected to the chamber 128 for providing a source of atmospheric pressure thereto. The second valve port 164 is positioned at the end of the shoulder 132 closest to the through bore 124. The vacuum valve port 168 is disposed in the bottom surface 104 of the valve body 114 and is connected in fluid communication to the chamber 128. Spaced-apart from the vacuum valve port 168 and disposed in the bottom surface 104 is a pilot suction cup valve port 172, which is in fluid communication with the chamber 128.

As shown best in FIG. 5, when the vacuum supply valve 32 is mounted to the distribution manifold 24 such that the bottom surface 104 engages against the top of the distribution manifold 24, the vacuum valve port 168 is aligned with the vacuum valve port 44 of the distribution manifold 24 to fluidly connect the vacuum channels 54 with the chamber 128, and the pilot suction cup port 172 is aligned with the pilot suction cup port 48 of the distribution manifold 24 to fluidly connect the pilot suction cup 36 with the chamber 128.

Still referring to FIG. 5, the vacuum supply valve 32 further includes a valve cylinder 180, which is fixedly mounted within a portion of the chamber 128, and a valve piston 182, which is movably retained within the chamber 128 and cooperates with the valve cylinder 180. As best shown in FIG. 6C, the valve cylinder 180 includes a longitudinally extending through bore 186, and a cross slot 190 having a larger cross sectional area than the through bore 186 at one end. The slot 190 is configured to receive a portion of the rectangular vacuum tube 126B (see FIG. 7) therein. The valve cylinder 180 further includes a channel 194 positioned transverse to the through bore 186. The channel is in fluid communication with the through bore 186 and opens radially out of the outer surface 200 of the valve cylinder 180. The valve cylinder 180 further includes a groove 196 at its end face, which extends from the outer surface 200 of the valve cylinder 180 and connects with the through bore 186. It will be appreciated that the valve cylinder 180 may include other components or structural features for optimally practicing the present invention, such as perimeter extending grooves 202 disposed in the outer surface 200 and the inner through bore surfaces of the valve cylinder 180. The grooves 202 are configured to accept rings seals therein during use.

When mounted within the chamber 128, as best shown in FIG. 7, the valve cylinder 180 abuts against the adjacent face of the mounting block 120 on one side and the shoulder 132 on the other. The valve cylinder 180 is sufficiently sized such that the outer surface 200 of the valve cylinder 180 seats closely against the inner side surfaces of the chamber 128. Additionally, the though bore 186 is fluidly connected to the vacuum tube 126B via an orifice 188 therein, the channel 194 is substantially aligned with the vacuum valve port 168, and the valve cylinder groove 196 fluidly communicates with the second valve port 164. As such, the vacuum valve port 168 is in fluid communication with the vacuum tube 126B through the channel 194 and the through bore 186. In the embodiment shown, the valve cylinder 180 and the valve body are separate components. However, in other embodiments, it will be appreciated that the valve cylinder and the valve body may be unitary in construction or composed of even more components than described above.

Referring again to FIG. 5, the vacuum supply valve 32 includes a piston 182 disposed within the chamber 128 in a translatable manner. As best shown in FIG. 6B, the piston 182 includes a baseplate portion 210 from which a stem 214 extends in one direction, and an outer perimeter flange 218 extends in the opposite direction. The piston 182 is sized and configured such that when assembled, the flange 218 can slidable seat against the contact surface 142 of the shoulder 132, while the stem can slidably seat within the valve cylinder through bore 186. A bore 222 is routed through the stem 214, which opens into a larger blind bore 226 formed by the flange 218 via a small diameter orifice 228 in the baseplate portion 210. The baseplate portion 210 forms a ring-shaped contact surface 232, positioned outward of the stem 214. A shallow groove 236 extends around the outer perimeter of the stem 214 adjacent the baseplate portion 210 for forming a section of the stem 214 with a smaller cross-sectional area.

Figure 8:
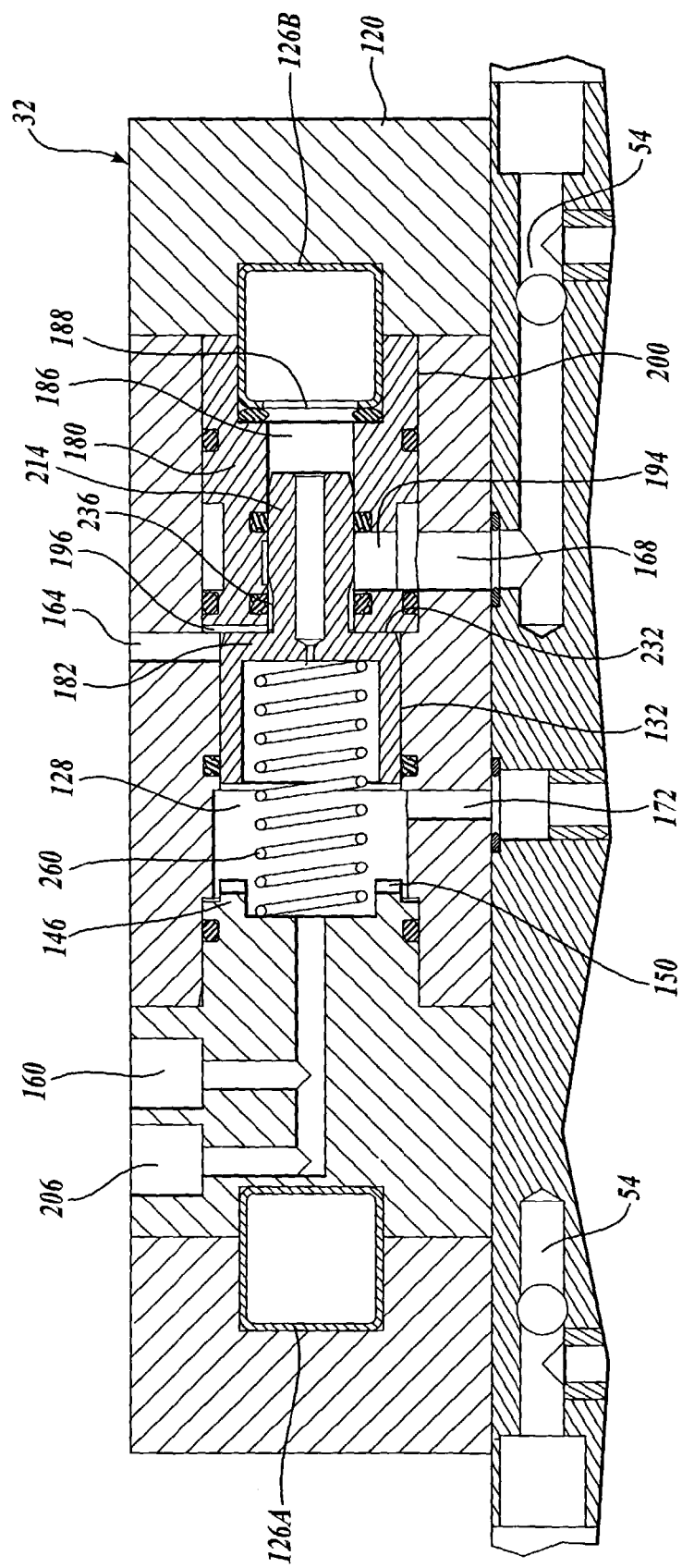
FIG. 8 is a partial longitudinal cross-section view of the vacuum pick-up head, wherein the vacuum supply valve is in the closed position.

When mounted in the chamber and cooperating with the valve cylinder, the piston is movable between a first open position shown in FIG. 7 and a second closed position shown in FIG. 8. As best shown in FIG. 7, the piston flange 218 abuts against the flange 146, the grooves 150 of the flange 146 connect the pilot valve port 172 with the interior space occupied by the optional spring 260, and the stem 214 is slidably seated within the through bore 186 of the valve cylinder 180 and positioned such that the vacuum valve port 168 is in fluid connection with the orifice 188 of the vacuum tube 126B via the channel 194 and a portion of the through bore 186. As the piston 182 translates within the chamber 128 from the position shown in FIG. 7 to the position shown in FIG. 8, the piston 182 is guided by the engagement between the contact surfaces of the shoulder 132 and the outer surface of the flange 218, and the inner through bore surfaces of the valve cylinder 182 and the outer surface of the stem 214.

Once the piston 182 has attained the second closed position shown in FIG. 8, the contact surface 232 of the piston 182 abuts against the adjacent end of the cylinder 180, the piston groove 236 is aligned with the valve cylinder groove 196 and the channel 194 so that the second valve port 164 fluidly communicates with the vacuum valve port 168, and the stem 214 of the piston 182 blocks the fluid communication between the channel 194 and the vacuum source supplied by the vacuum tube 126B. As such, the piston 182 translates between a open valve position and a closed valve position, thereby selectively establishing fluid communication between a source of vacuum pressure provided by the vacuum tube 126B and the vacuum valve port 168.

The vacuum supply valve 32 may optionally include a biasing member, such as spring 260, for biasing the piston 182 toward the valve cylinder 180. When assembled, one end of the spring 260 is retained by the base of the step bore 148 formed by the flange 146 while the opposite end of the spring 260 is retained by the base of the bore 226 formed by the flange 218 of the piston 182.

Returning to FIG. 6A, the valve body 114 may optionally include a vacuum sensor port 206, which is fluidly connected to the passageway 130. The vacuum sensor port 206 is adapted to be connected to a vacuum sensor or vacuum switch (not shown). The optional vacuum switch or sensor allows the material handling system to monitor the operation of the pick-up head. While the vacuum sensor port 206 is shown connected to the passageway 130, it will be appreciated that the vacuum sensor port 206 may have other locations. For example, the vacuum sensor port may be positioned in the distribution manifold and fluidly connected to the vacuum channels. Alternatively, one of the existing openings in the side of the distribution manifold shown in FIG. 4 may be optionally connected to the vacuum sensor/ switch instead of being sealed.

Figure 11:
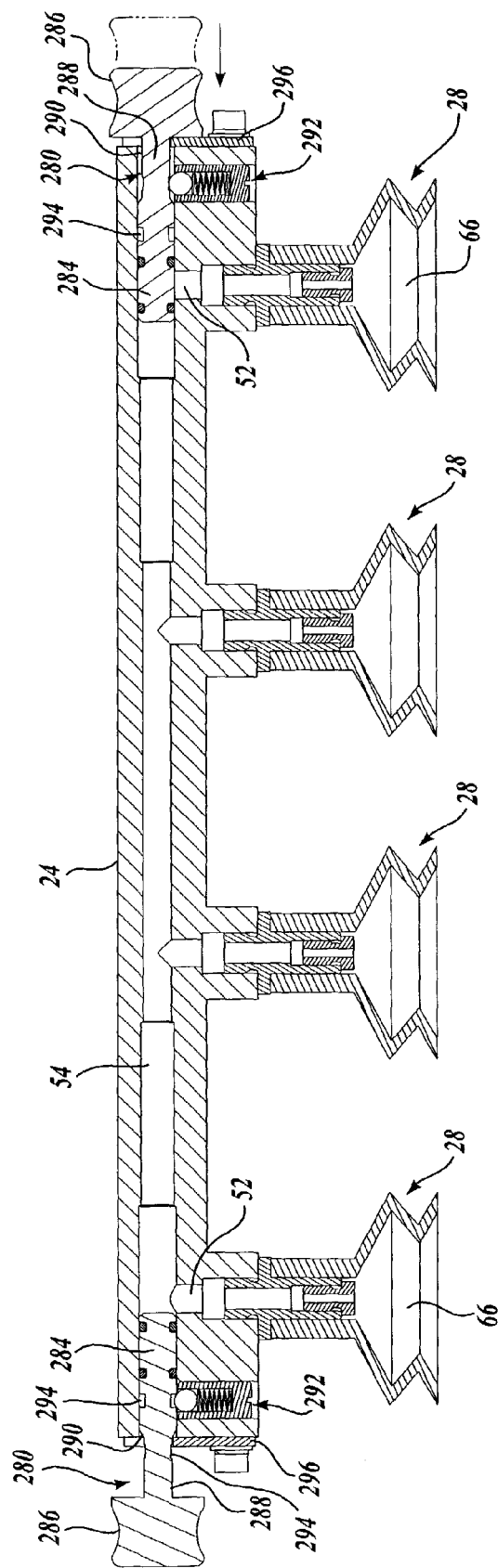
FIG. 11 is a longitudinal cross-section view of the distribution manifold connected to the suction cups.

In accordance with another aspect of the present invention, the pick-up head 20 may further be configured to selectively interrupt the supply of vacuum pressure to one or more suction cups 28. To this end, the pick-up head may be used to handle objects of different sizes, shapes, and weights. Turning now to FIG. 11, there is shown a longitudinal cross-section view of the distribution manifold 24 connected to the suction cups 28. As best shown in FIG. 11, vacuum pressure interruption actuators 280 (hereinafter "the actuators 280") may be operably connected to the ends of the vacuum channels 54 for selectively interrupting vacuum pressure to selected suction cups. The actuators 280 may include a shaft 284 having a knob 286 formed at its outside end. As the shaft 284 extends toward the knob 286, a neck portion 288 having a smaller cross-section area is formed. The shaft 284 is sized and configured to slidably seat within the vacuum channels 54, while having a sufficient length to block the suction cup ports 52.

When assembled, the shafts 284 of the actuators 280 are inserted into openings 290 at the ends of the distribution manifold 24, the openings 290 being connected to the vacuum channels 54 that extend lengthwise within the distribution manifold 24. The actuators 280 are selectively movable between an "in" position, wherein the shafts 284 block the selected suction ports 52 (shown in the right side of FIG. 11), thereby interrupting the supply of vacuum pressure to the corresponding suction cup cavities 66, and an "out" position, wherein the shafts 284 do not block the selected suction ports 52 (shown in the left side of FIG. 11), thereby fluidly connecting the supply of vacuum pressure to the corresponding suction cup cavities 66. The actuators 280 are maintained in either position by spring plungers 292, which have detent balls that seat within notches 294 positioned at spaced apart locations in the shafts 284. It will be appreciated that the shafts 284 may include other structural features, such as annular grooves, which receive ring seals for sealing the vacuum channels 54. A retaining plate 296 may further be attached to the distribution manifold 24 at the location of the outer openings 290. The retaining plate 296 is configured to engage the neck section 288 of the shafts 284, thereby restricting the outward movement of the actuators 280.

Figure 12:
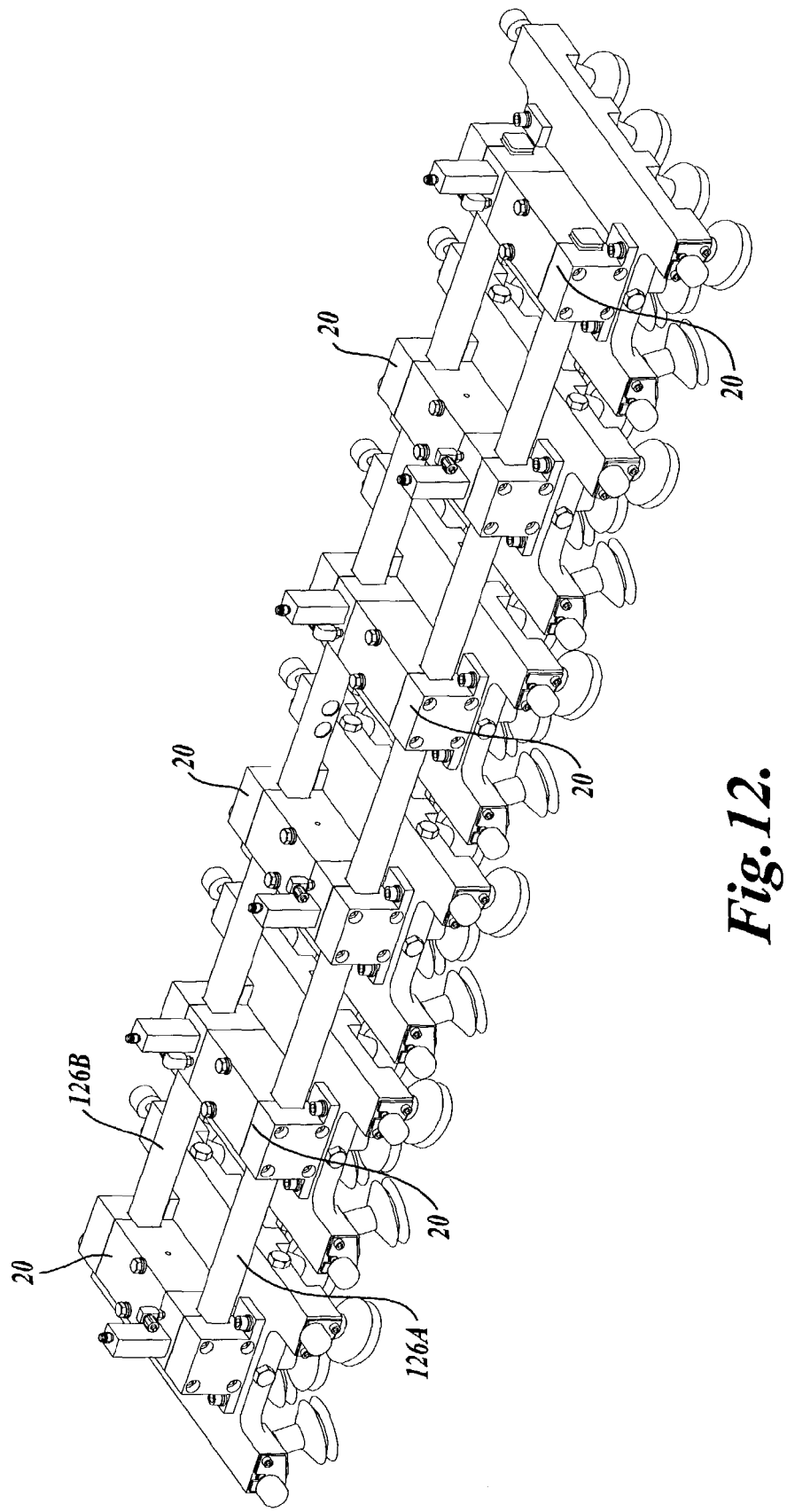
FIG. 12 is a perspective view of a plurality of vacuum pick-up heads of FIG. 1 operationally connected by parallel vacuum tubes.

FIG. 12 is a perspective view of a plurality of pick-up heads 20 connected in a spaced apart, side-by-side arrangement through vacuum tubes 126A and 126B. In FIG. 12, the pick-up heads 20 are alternatingly arranged 180 degrees so that both vacuum tubes 126A and 126B can be used to interconnect the pick-up heads 20 and to supply a source of vacuum pressure alternatingly thereto. In this configuration, the pick-up heads 20 can grasp multiple objects simultaneously, while each vacuum tube handles half of the total vacuum flow.

Figure 9:
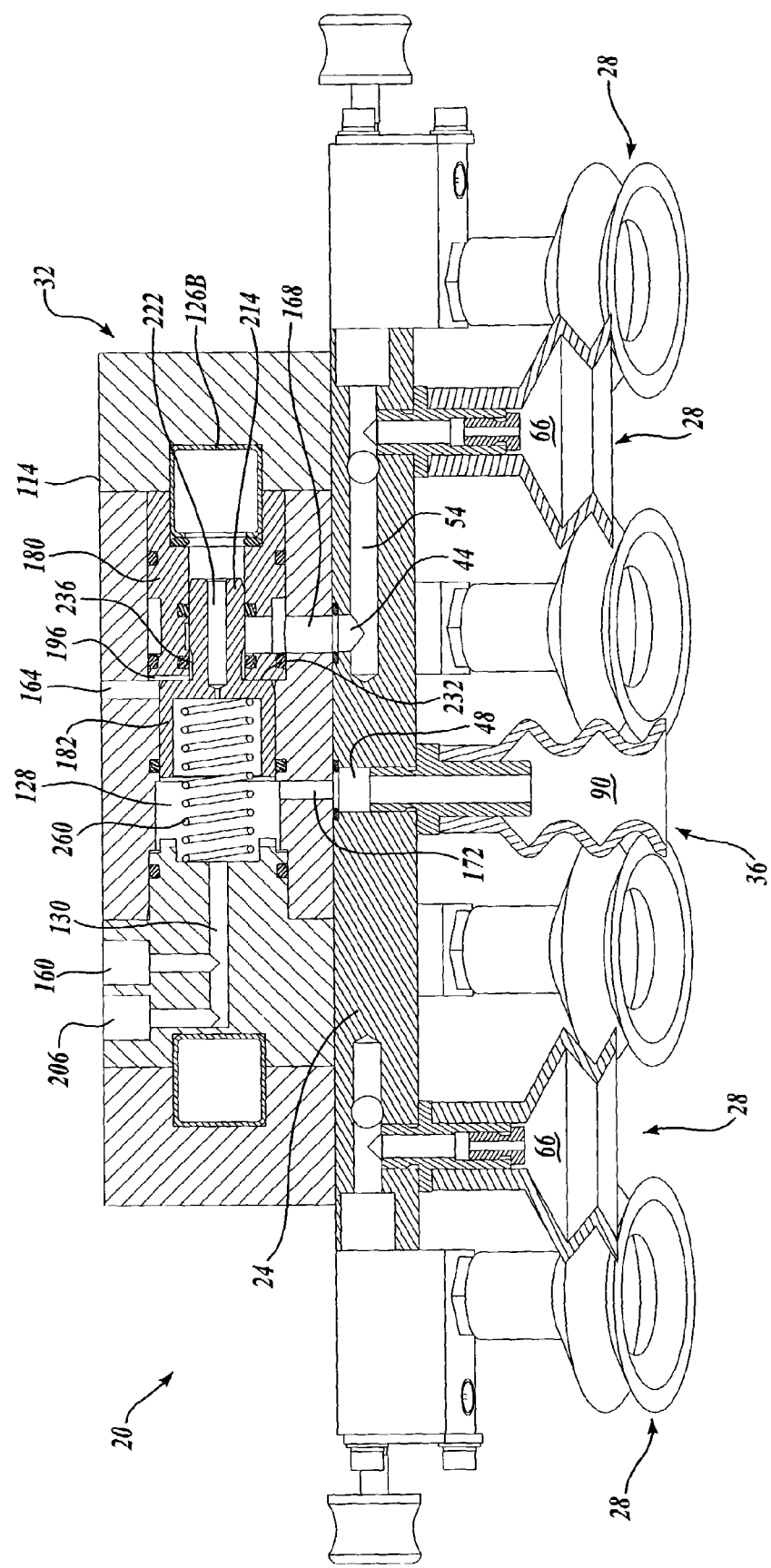
FIG. 9 is a longitudinal cross-section view of the vacuum pick-up head, wherein the vacuum supply valve is in the closed position.

The operation of the vacuum pick-up head 20 of the present invention will now be described with reference to FIGS. 9 and 10. The pick-up head 20 of the present invention is connected to a manipulating device (not shown), which moves the pick-up head 20 between a first or pick-up position and a second or drop-off position. The pick-up head 20 is utilized for gripping the object at the pick-up position, retaining the object during the movement between the pick-up and drop-off positions, and releasing the object when the manipulating device as reached the drop-off position.

Prior to grasping the object in the pick-up position, the following operating conditions of the pick-up head 20 will be described with reference to FIG. 9. As shown in FIG. 9, the pilot suction cup 36 is free from sealable contact with the object to picked-up and transported, and the piston 182 is positioned in its rightward most orientation, forced against the valve cylinder 180 by the atmospheric pressure present in the chamber 128 on the passageway side of the piston 182 (i.e., the left side of the piston 182 in FIG. 9) in combination with the spring force of optional spring 260 and the vacuum pressure environment proximal to the vacuum tube 126B. Additionally, the first valve port 160, preferably connected to a solenoid valve, is closed and the optional vacuum sensor port 206 is closed, or is connected to a vacuum sensor or vacuum switch (not shown) if desired. Further, fluid communication is, established between the atmosphere pressure conditions located outside the valve body 114 and the vacuum valve port 168 via the second vacuum port 164, the cylinder groove 196 and the piston groove 236. Finally, fluid communication between the source of vacuum pressure supplied by the vacuum tube 126B and the vacuum valve port 168 is interrupted by the stem 214 of the piston 182.

When the pick-up head 20 is moved into the pick-up position by the manipulating device to grasp the object (not shown) with the vacuum pressure interrupted as just described, the pilot suction cup 36 detects the presence of the object by contacting and sealing against the object surface. Once the pilot suction cup 36 detects the presence of the object, vacuum pressure is supplied to the suction cups 28 automatically through the operation of the vacuum supply valve 32.

Once the pilot suction cup 36 seals against the object surface, the gas (e.g., air) occupying the pilot suction cup cavity 90 of the pilot suction cup 36 and the portion of the chamber 128 on the passageway side of the piston (i.e., the left side of the piston 182 in FIG. 9) evacuates through the through bore 222 in the piston 182 by the vacuum pressure created by the vacuum tube 126B, which in turn causes the pressure in this portion of the chamber 128 to drop. Simultaneously as the air is evacuated from the chamber 128, atmospheric pressure enters the second valve port 164 and continues into the cylinder groove 196. The atmospheric pressure present in the cylinder groove 196 exerts a force against the contact surface 232 of the piston 182. Thus, the atmospheric pressure forces or biases the piston 182 from the piston position shown in FIG. 9 away from the vacuum tube 126B to the piston position shown in FIG. 10. As the piston 182 translates to the piston position in FIG. 10, the optional spring 260 compresses, and the stem 214 unblocks the vacuum valve port 168, thereby connecting the suction cup cavities 66 to the vacuum pressure supplied by the vacuum tube 126B. This causes the suction cups 28 to grasp the object. The pick-up head 20 can then be moved to transfer the object to the drop-off position.

Figure 10:
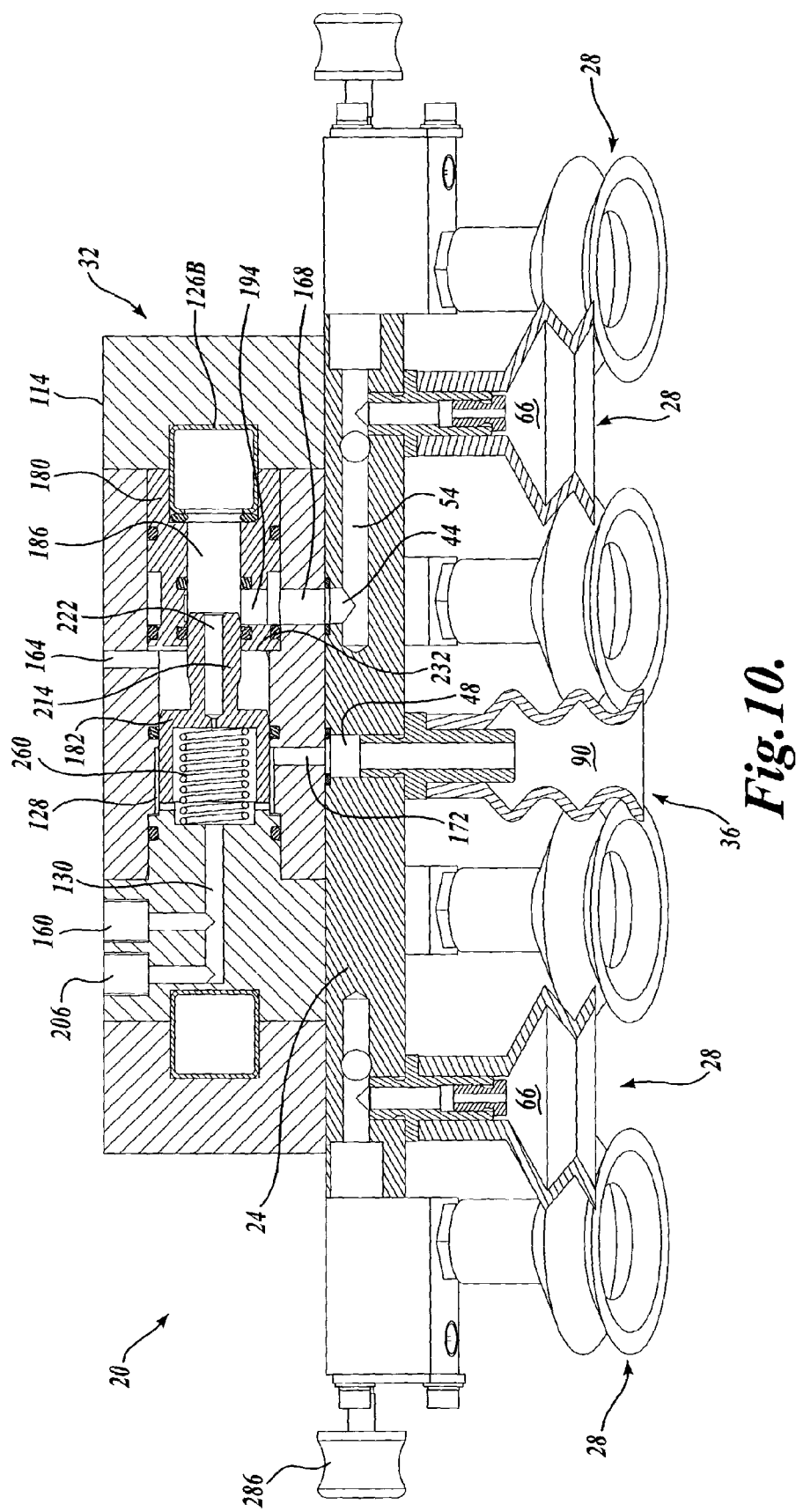
FIG. 10 is a longitudinal cross-section view of the vacuum pick-up head, wherein the vacuum supply valve is in the open position.

Once the object has been transported by the manipulating device to the second, drop-off position, the object may be released from the pick-up head 20 by the following steps with reference to FIG. 10. First, the solenoid valve connected to the first valve port 160 is opened to atmospheric pressure so that atmospheric pressure is introduced into the chamber 128 through the passageway 130. The atmospheric pressure introduced into the chamber 128 by passageway 130, in combination with the spring force of spring 260, overcomes the atmospheric pressure exerted against the contact surface 232 of the piston 182, causing the piston 182 to translate from the piston position shown in FIG. 10, to the piston position shown in FIG. 9. Once the piston 182 has translated to the piston position in FIG. 9, the stem 214 shuts off the fluid communication between the source of vacuum pressure supplied by the vacuum tube 126B and the channel 194, thereby closing the vacuum supply valve 32.

Once the vacuum supply valve 32 is closed, fluid communication is established between the atmosphere (i.e., outside the valve body) and the vacuum valve port 168 via the second valve port 164, the cylinder groove 196, and the piston groove 236. Atmospheric pressure supplied to the vacuum valve port 168 through this fluid communication, which is then supplied to the suction cup(s) via the vacuum channels 54, breaks the vacuum between the suction cup(s) 28 and the object such that the object is released from the pick-up device 20. In one embodiment, the inlet port of the solenoid valve (not shown) may be connected to a source of compressed air instead of atmospheric pressure to accelerate the closing of the vacuum supply valve 32. The resulting pneumatic pressure supplied to the chamber 128 by the passageway 130 when the solenoid valve is opened will immediately force the vacuum supply valve 32 to the closed position, and hence, reduce the closing time of the vacuum supply valve 32.

In the instance that the pilot suction cup 36 fails to detect the presence of the object, for example when either the object is not picked up (after sealing contact with the object) or the object drops off during the subsequent movement of the pick-up head 20 due to insufficient grip between the suction cup(s) 28 and the object, the vacuum supply valve 32 will automatically close. This occurs due to the lost contact and seal between the pilot suction cup 36 and the object, which thereby causes the pressure in the portion of the chamber 128 on the passageway side of the piston (i.e., the left side of the piston in FIG. 10) to increase, which in turn, subsequently closes the vacuum supply valve 32. This occurs by the following steps. First, when the pilot suction cup 36 is not sealed off, a small airflow passes through the piston bore 222. The atmospheric pressure in the portion of the chamber 128 on the passageway side of the piston (i.e., the left side of the piston in FIG. 10), in conjunction with the optional spring 260, pushes the piston 182 towards the vacuum tube 126B. As the piston 182 translates from the piston position shown in FIG. 10 to the piston position shown in FIG. 9, the stem 214 seals off the vacuum valve port 168 from the source of vacuum pressure, thereby closing the vacuum supply valve.

By automatically closing the vacuum supply valve when the object is not detected in cases where the object drops off or is not successfully pick-up by the pick-up device 20, and thus, terminating the supply of vacuum pressure to the suction cups 28, vacuum losses to other pick-up heads 20 in systems where multiple pick-up heads 20 are connected to the same vacuum pump as seen in FIG. 12 are prevented. If the optional vacuum sensor/switch is connected to the vacuum sensor port 206, the vacuum sensor/switch resets, thereby generating a signal for the material handling system that vacuum pressure in the pilot suction cup cavity 90 has been lost. If this occurs during the movement of the pick-up head 20 before the pick-up head 20 reaches its normal drop-off position (where the solenoid valve is activated), the generated signal from the vacuum sensor/switch then indicates that the object has been lost prior to reaching the drop off position.

While pilot suction cup 36 has been described above and illustrated herein as the detection device for detecting the presence of an object and controlling the operation the vacuum supply valve based on such detection, it will be appreciated that alternative detection methods may be used. One alternative embodiment of a pick-up head 300 illustrating one such suitable method will now be described with reference to FIGS. 13A and 13B, which illustrate partial cross section views of the pick-up head 300 configured with a detection device 310 operably connected to the pilot valve port 172 of the distribution manifold 24. The components of the alternative embodiment of the pick-up head 300 are substantially identical to those described above, except for the differences that will now be described. For clarity in the description, reference numerals for identical components of the pick-up head 20 described above will be used when describing pick-up head 300.

Figure 13A:
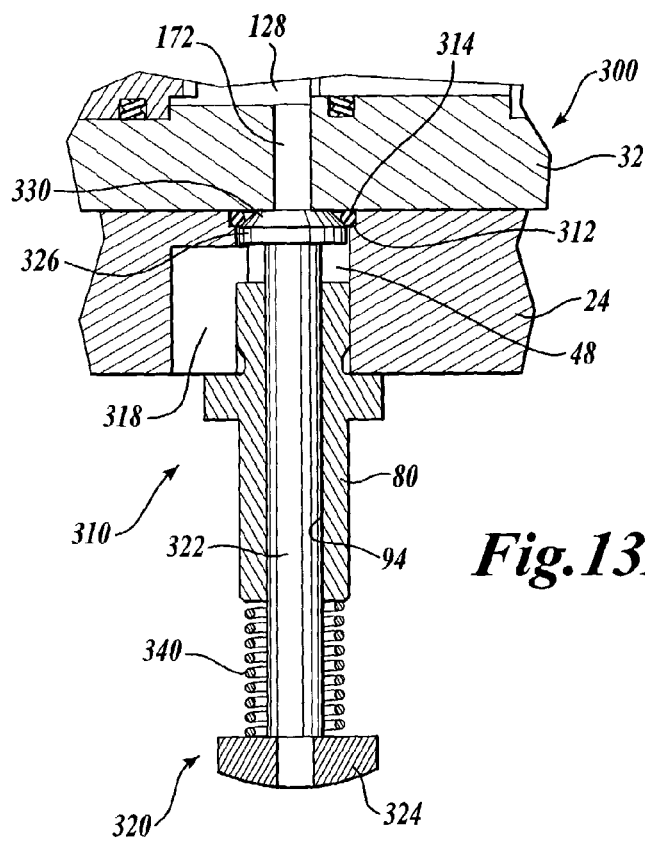
FIGS. 13A and 13B are partial cross-section views of an alternative embodiment of the vacuum pick-up head.
Figure 13B:
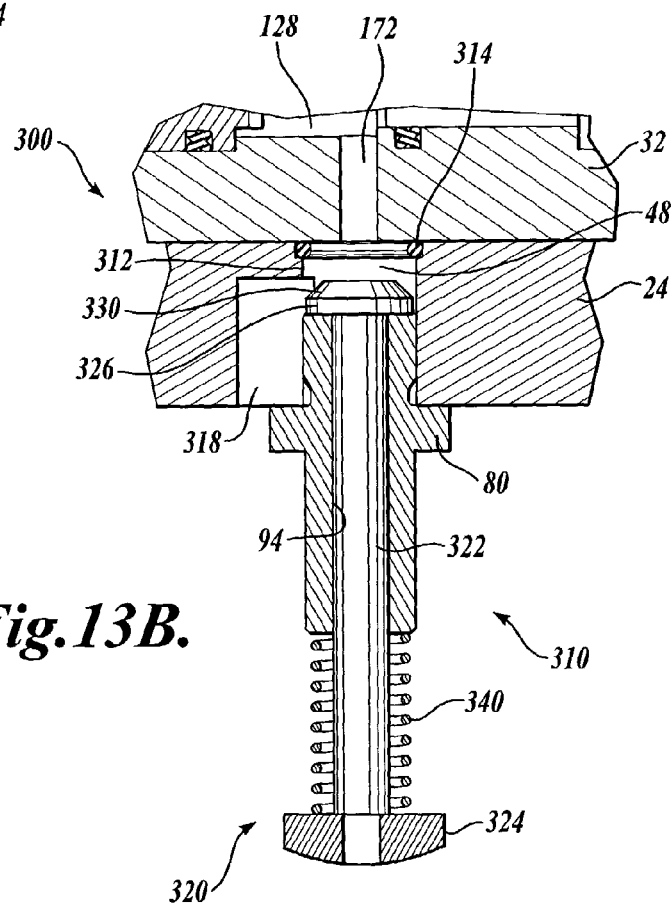

As best shown in FIGS. 13A and 13B, the port 48 of the distributive manifold 24 includes an annular shoulder 312 proximal to the pilot valve port 172 that retains a ring seal 314. A side channel 318 is provided in the distribution manifold 24, which is disposed adjacent to the connector fitting 80 and connected in fluid connection to the pilot valve port 172 through port 48. The channel 318 provides air at atmospheric pressure to be supplied to the chamber 128. The detection device 310 includes a connector fitting 80 removably secured to the port 48. The connector fitting 80 and the port 48 may be cooperatively configured for threadably securing the connector fitting 80 to the distribution manifold 24. The detection device 310 further includes a plunger 320 having an elongated shaft 322 sized and configured to be slidably received within the connector fitting bore 94. At the outward end of the shaft 322, an end plate 324 is fastened thereto, and at the inward end of the shaft 322 there is attached a head plate 326. The head plate 326 has a frusto-conical tip 330 that defines a sealable contact surface, and is sized and configured to translate within the port 48 and to sealably engage with the ring seal 314.

When assembled, the plunger 320 is slidably retained by the connector fitting 80 and is outwardly biased by a compression spring 340, which engages the outward end of fitting 80 and the end plate 324. In operation, when the pick-up device 20 is moved into the pick-up position, the detection device310 detects the presence of the object by contacting the object with the end plate 324, thereby translating the plunger 320 toward the pilot valve port 172 against the biasing force of the spring 340. Under sufficient force by the object, the plunger 320 translates toward the pilot valve port 172 until the frusto-conical tip 330 of the head plate 326 sealably contacts the ring seal 314 to form a leak-proof connection therebetween as shown in FIG. 13A, thereby shutting off valve port 172 from the atmospheric pressure supplied by the channel 318. Once pilot valve port 172 is shut off, the vacuum supply valve (not shown) is operated from the closed position to the open position through the steps described above with reference to FIGS. 9 and 10.

As soon as the object falls off the pick-up device 300, or the object is released at the drop-off position, the plunger 320 translates outwardly to the position shown in FIG. 13B by the biasing force of the spring 340. In this position, the head plate 326 abuts against the inward end of the connector fitting 80, the ring seal 314 is retained by the annular shoulder 312, and the channel 318 is in fluid communication with the pilot valve port 172 through port 48 of distribution manifold 24. As such, air at atmospheric pressure is introduced into the chamber 128 by port 48, thereby causing the vacuum supply valve (not shown) to operate from the open position to the closed position through the steps described above with reference to FIGS. 9 and 10.

While the embodiments of the present invention described above and illustrated herein detect the presence of an object, and in turn, control the operation of the vacuum supply valve by mechanical methods, it will be appreciated that electrical methods, such as optical switches, proximity sensors, etc., may also be used and are contemplated to be within the scope of the present invention, as claimed. Accordingly, it will be appreciated that the optical switches, proximity sensors, etc., can be adapted by one skilled in the art to be practiced with the present invention for selectively controlling the opening and closing of pilot valve port 172. Alternatively, the optical switches, proximity sensors, etc., may be use with a conventional solenoid valve instead of the vacuum supply valve 32 for selectively supplying vacuum pressure to the suction cups.

While a few of the preferred embodiments of the invention have been illustrated and described, it will be appreciated that various changes can be made therein without departing from the spirit and scope of the invention. For example, while the vacuum supply valve has be shown and described herein as being integral or mounted to the distribution manifold, it will be appreciated that the vacuum supply valve may be attached to another component of the material handling system remote from the distribution manifold, and fluidly connected thereto using suitable piping known in the art.

What is claimed is:

1. A vacuum pick-up device usable in a material handling system for grasping an object with vacuum suction, comprising:

a distribution manifold having a detection device port, a vacuum valve port, and at least one suction cup port, and at least one conduit interconnecting the suction cup port and the vacuum valve port;

at least one suction cup connected to the distribution manifold, the suction cup having a sealable contact surface defining an orifice, the orifice connected in fluid communication with the suction cup port for receiving a supply of vacuum suction thereto;

a detection device connected to the distribution manifold, the detection device operable to detect the presence of the object; and a vacuum supply valve defining a chamber and having a piston movably disposed therein, the chamber connected in fluid connection to a source of vacuum suction, and further connected in fluid communication to the detection device port and the suction cup port, the vacuum supply valve having a first position, wherein vacuum suction from the source of vacuum suction is supplied to the orifice of the suction cup, and a second position, wherein vacuum suction from the source of vacuum suction is interrupted to the orifice of the suction cup, the movement of the piston between the first and second positions being controlled automatically by the detection device.

2. The device of claim 1, wherein the detection device is a pilot suction cup, the pilot suction cup having a sealable contact surface defining an orifice, the orifice connected in fluid communication with the detection device port.

3. The device of claim 2, wherein the movement of the piston between the first and second positions is controlled automatically by the pilot suction cup selectively detecting the presence of the object in sealing contact with the sealable contact surface of the pilot suction cup.

4. The device of claim 2, wherein the piston moves from the first position to the second position when the object is not in sealing contact with the sealable contact surface of the pilot suction cup.

5. The device of claim 2, wherein the piston moves from the second position to the first position when the object is in sealing contact with the sealable contact surface of the pilot suction cup.

6. The device of claim 2, wherein the pilot suction cup extends away from the distribution manifold a further distance than the suction cup.

7. The device of claim 2, wherein the orifice of the pilot suction cup is connected in fluid communication with the source of vacuum suction.

8. The device of claim 1, wherein the detection device port is connected to a source of atmospheric pressure.

9. The device of claim 8, wherein the detection device includes an actuator operable to close the detection device port.

10. The device of claim 9, wherein the actuator is outwardly biased away from the distribution manifold.

11. The device of claim 1, further comprising a plurality of suction cups connected in fluid communication with the chamber through a plurality of suction cup ports.

12. The device of claim 11, further comprising a flow restrictor removably connected to at least one suction cup of the plurality of suction cups for restricting fluid flow through the suction cup orifices.

13. The device of claim 12, wherein the supply of vacuum suction to at least one of the plurality of suction cups may be selectively interrupted by a user.

14. The device of claim 13, further comprising at least one actuator movably connected to the distribution manifold through the conduit, the actuator selectively movable to block one of the suction cup ports.

15. The device of claim 1, wherein the vacuum supply valve further comprises a first valve port connected in fluid communication with the chamber, the first valve port adapted to supply a selective source of atmospheric pressure to the chamber for exerting force against the piston.

16. The device of claim 15, wherein the vacuum supply valve further comprises a second valve port connected in fluid communication with the chamber, the second valve port adapted to supply a source of atmospheric pressure to the chamber for exerting force against the piston.

17. The device of claim 16, wherein the vacuum supply valve further comprises a third valve port connected in fluid communication with the chamber, the third valve port adapted to be connected to a vacuum sensor or a vacuum switch.

* * * * *